E. & G. DE MATTIA.
PROCESS OF ROASTING COFFEE.
APPLICATION FILED APR. 9, 1907.

943,238.

Patented Dec. 14, 1909.

WITNESSES:

INVENTORS,
EMILIO DE MATTIA
GIACOMO DE MATTIA
Attorneys

UNITED STATES PATENT OFFICE.

EMILIO DE MATTIA, OF RECOARO, ITALY, AND GIACOMO DE MATTIA, OF SAN PAOLO, BRAZIL.

PROCESS OF ROASTING COFFEE.

943,238.	Specification of Letters Patent.	Patented Dec. 14, 1909.

Application filed April 9, 1907. Serial No. 367,297.

*To all whom it may concern:*

Be it known that we, EMILIO DE MATTIA, a subject of the King of Italy, and resident of Recoaro, in the Kingdom of Italy, and GIACOMO DE MATTIA, a subject of the King of Italy, and resident of San Paola, Republic of Brazil, have invented certain new and useful Improvements in Processes of Roasting Coffee, of which the following is a specification.

The present invention relates to a process of roasting coffee economically and so as to deliver the roasted coffee in the best condition possible.
In the accompanying drawings, we have shown apparatus which may be usefully employed in carrying out said process.

Figure 1:
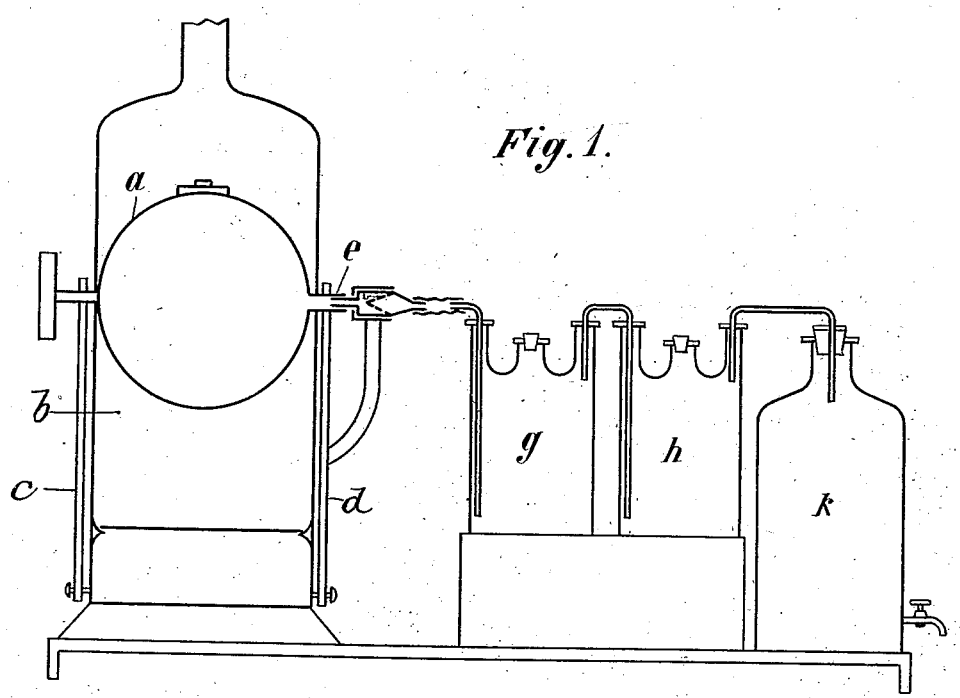
Figure 2:
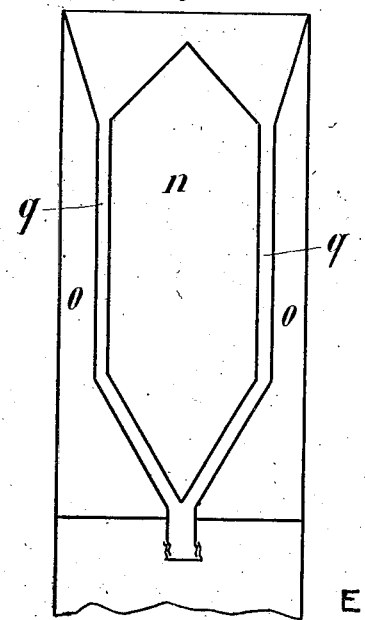

Referring to said drawings, Figure 1 shows, diagrammatically and in vertical section, apparatus for torrefaction of the coffee, while Fig. 2 shows, also diagrammatically and in vertical section, the apparatus for refrigerating the coffee.

By the new process, the coffee is roasted in an appropriate torrefactor, placed in communication with two Woulfe's bottles connected in series, the first containing water, and the second containing a solution of discolored fuchsin with 0.25% of sulfurous anhydrid. An aspirator, connected with said bottles, serves to aspire the gases which develop during the process of torrefaction. The aspirator forces the gases given off by the coffee through the two Woulfe's bottles;
the water in the first of these retains the pyridic compounds, while a characteristic and important phenomenon takes place in the second, for when the coffee is perfectly roasted the solution in bottle No. 2 assumes an intense violet coloring. When the torrefaction has attained its point of perfection, as indicated by the above said violet coloring, the roasted coffee is poured into a refrigerator, cooled by ice, and having its interior excluded from the air and previously filled with carbonic acid, thus assuring rapid cooling and also avoiding the oxidation and volatilization of the oils of the coffee berries. The coffee is subsequently allowed to drop into metal receptacles filled with carbonic anhydrid.

The roasting apparatus which may be employed consists (Fig. 1) of a hollow iron ball, a, which is rotatably supported in a cylindrical furnace b also made of metal, and which is heated with coal. The ball is turned on its own axis by means of a crank or motor, and is supported by the sides of the furnace and by two metallic uprights, c and d, united at the base of the furnace by an articulated foot, to allow the ball to be taken out of the furnace precisely above the opening of the refrigerator.

The ball, as shown, terminates, at the right hand side of its axis, in a tube, e, which serves for carrying off the gases and performs the functions of a sleeve of one of the extremities of the iron cylinder, which is connected, by an india rubber tube, at its other extremity with the Woulfe's bottles, g and h, and with the aspirator k. This cylinder, having to be quickly united with and detached from the ball, is furnished with a collar sliding in a coupling box, supported by an arm fixed to the lower part of the furnace.

The illustrated roasting apparatus does not require the use of an assayer, in order to ascertain the exact state of torrefaction, as the completion of torrefaction may be ascertained by the coloring of the second Woulfe's bottle, h, as above stated. The intense violet color of the solution in bottle No. 2 is the indication of the perfect and complete roasting of the coffee.

The refrigerator (Fig. 2) consists of two vertical concentric cylindrical bodies n and o, of which o is a little longer than n. The body n is filled with ice, while the body o is surrounded by ice. The annular space q between the two cylinders, is reserved for the coffee. The body n has at its upper and lower ends cones, the cylinder o ends, at its lower part, in a truncated cone tending parallel with the lower cone of the part n, and passes into a small discharge cylinder, hermetically closed by a plug. The body o is widened, at its upper part, to form an upset truncated cone, which facilitates the filling of coffee into the refrigerator. The space between the two bodies, running parallel with each other, is filled, at the moment it is to receive the coffee (the small discharge cylinder being closed by the plug) with carbonic anhydrid. The roasted coffee is dumped into the refrigerator from the torrefactor, and is divided and distributed, by the upper cone of body n, all around the annular space q. It is left a few minutes in the refrigerator, during which time a small current of carbonic anhydrid is passed through the coffee. When the refrigerating process is finished, the small discharge cylinder will be opened and the coffee dumped into the tinned iron-plate vessels.

By the process constituting the subject-matter of the present application the coffee is perfectly roasted and is cooled immediately upon being dumped in the refrigerator thus avoiding the volatilization and oxidation of the oils of the coffee, which, in the absence of the carbonic anhydrid, might readily occur upon subject of the hot coffee, direct from the roaster, to the action of the air. The apparatus herein described constitutes the subject-matter of an application, Serial No. 367,296, filed April 19, 1907, for Letters Patent of the United States.

What we claim is:

1. The process of roasting coffee, which consists in heating the same until the escaping vapors produce a violet color when passed through a solution of fuchsin mixed with sulfurous anhydrid, then cooling the roasted coffee in carbonic anhydrid under the exclusion of atmospheric air; substantially as described.

2. The process of roasting coffee, which consists in heating the same and leading escaping gases through a liquid until the latter assumes a color indicating the roasting of the coffee to the extent desired, and then cooling the roasted coffee in carbonic anhydrid under the exclusion of atmospheric air, substantially as described.

In witness whereof I have signed this specification, at Genoa, in the Kingdom of Italy, this 8th day of February 1907.

EMILIO DE MATTIA.

In the presence of—
   PAOLO ARNOLDO CASSINIS,
   ANGELO BORAGINO.

In witness whereof I have signed this specification at Santos in the Republic of Brazil, this 4 day of March 1907.

GIACOMO DE MATTIA.

In the presence of—
   JAS. C. MELL,
   HARRY G. ESTILL.